United States Patent Office 3,439,576
Patented Apr. 22, 1969

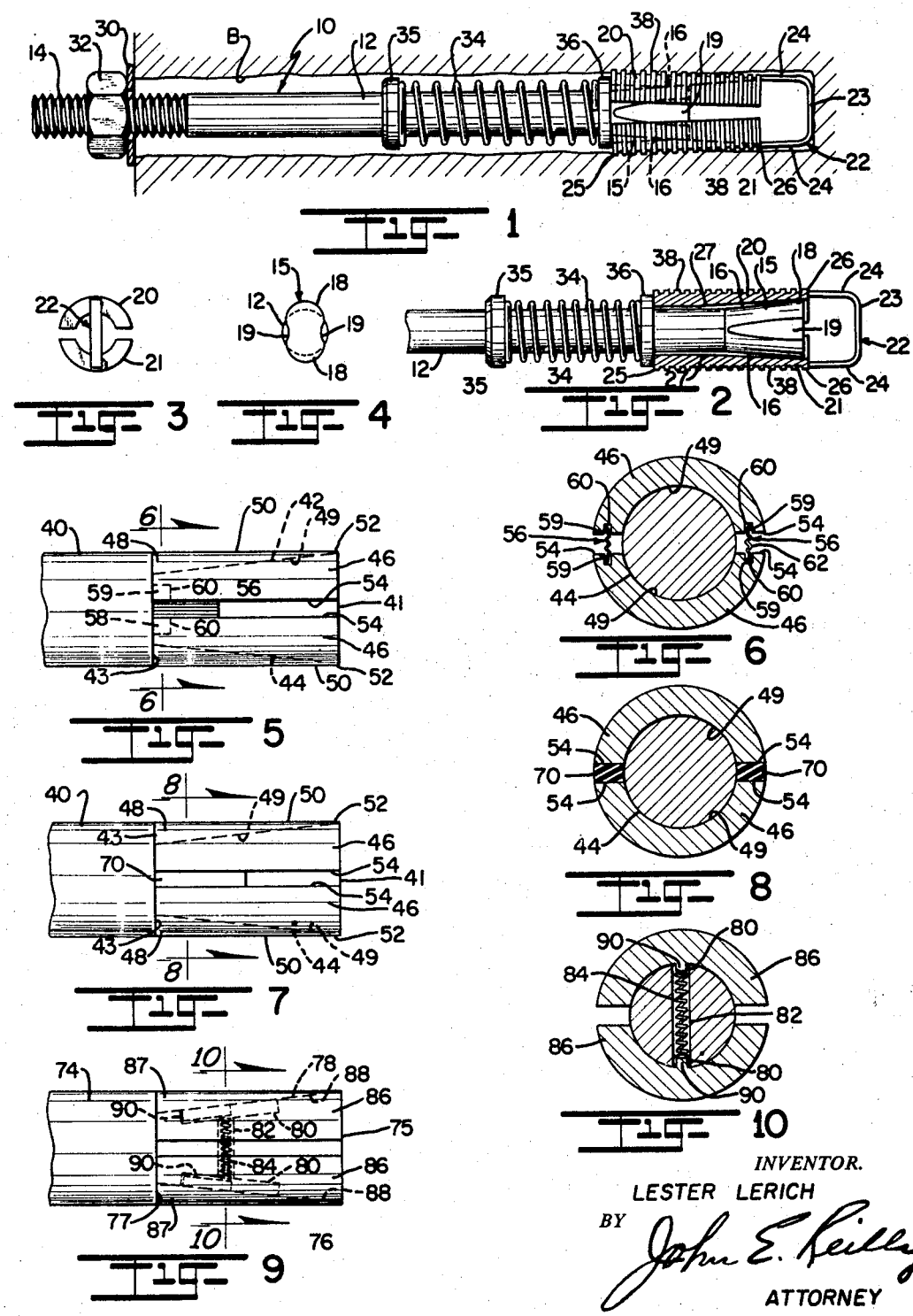

3,439,576
WEDGE TYPE EXPANSION BOLT
Lester Lerich, 30 Morningside Drive,
Lakewood, Colo. 80215
Original application May 20, 1965, Ser. No. 457,457, now Patent No. 3,257,891, dated June 28, 1966. Divided and this application Apr. 14, 1966, Ser. No. 542,557
Int. Cl. F16b *13/10;* E04c *5/12*
U.S. Cl. 85—79                                6 Claims

ABSTRACT OF THE DISCLOSURE

In a masonry expansion bolt, sleeve-like wedge members are disposed in an annular recess formed in the body of the shank portion of the bolt and are provided with inwardly directed resilient expansion means adjacent to the trailing ends of the wedge members to yieldingly urge the trailing ends outwardly into engagement with the wall of the hole in which the bolt is inserted so that, upon tightening of the bolt in the hole, the wedges will automatically be displaced forwardly along inclined bearing surfaces of the bolt into anchored engagement with the wall of the hole.

---

This invention releates to novel and improved fasteners, and more particularly relates to a wedge-type expansion bolt provided with improved expansion means which, upon insertion and tightening of the bolt in a bolt hole, will selectively force the wedging elements on the bolt into anchored relation within the hole in a positive, dependable manner. This is a division of application Ser. No. 457,457, filed May 20, 1965, now Patent No. 3,257,891 for Wedge Type Expansion Bolt.

The expansion bolt of the present invention is especially adapted for use in anchoring equipment, machinery and structural members in masonry or rock materials and the like. The customary procedure is to drill a hole of the required depth into the material, the hole being of a diameter to closely approximate or equal the size of the expansion bolt. Wedging elements are assembled on inclined faces of the bolt and are normally disposed to lie substantially within the peripheral surface of the bolt so as not to interfere with its insertion into the hole; then upon tightening, the wedging elements are caused to slide outwardly along the inclined surfaces into firm wedging engagement with the wall of the hole to anchor the bolt in place. When the bolt is to be anchored in masonry, it is especially important that the bolt once anchored is not subject to loosening or displacement; thus the inserted portion of the bolt including the wedging elements should fit snugly within the hole and in such a way that the wedging elements will exert uniform wedging action against the surrounding wall surface. Also, the wedging elements should be forced initially against the wall of the hole for subsequent displacement into anchored relation so as to lodge the bolt firmly in place and as deeply within the hole as possible. This can be effectively accomplished by selectively displacing the rearward or trailing ends of the wedging elements into initial contact with the wall of the hole prior to tightening of the bolt and at an angle such that the wedging elements will be displaced, upon tightening, into positive wedging engagement with the wall of the hole.

Accordingly, it is an object of the present invention to provide an improved fastener or securement device having wedging elements thereon being so constructed and arranged as to be rapidly and automatically displaceable into uniform wedging engagement with the wall of an opening under a minimum of outward displacement of the bolt from the opening.

It is another object of the present invention to provide for an improved wedge type expansion bolt which will permit hole size to closely approximate bolt size and specifically in which the wedging elements are displaceable outwardly from a position in substantially flush relation to the peripheral surface of the inserted portion of the bolt to a position protruding outwardly from the bolt into positive, uniform wedging engagement against the wall of the hole, and as opposed to localized wedging at spaced points around the wall of the hole.

It is a further object of the present invention to provide an improved expansion bolt which is of simple and inexpensive construction with each given bolt size being conformable for disposition in different sized openings within limits, and wherein the bolt has improved expansion means being so positioned in relation to a plurality of wedging elements on the bolt as to force the wedging elements into positive engagement with the wall of the hole prior to tightening of the bolt, and furthermore, wherein certain forms of the present invention are provided with expansion means and wedging elements wholly contained within the peripheral outline of the bolt during insertion in the hole, then automatically the expansion means will force the trailing ends of the wedging elements in a lateral direction outwardly against the wall of the opening prior to movement of the bolt in the opposite direction of withdrawal from the hole.

It is an additional object of the present invention to provide in a wedge type expansion bolt for a shank portion having an upset leading end providing outwardly divergent leading end surfaces for controlling movement of spring-biased wedging sleeve elements into uniform wedging engagement with the wall of the hole.

The above and other objects, advantages and features of the present invention will become more readily understood and appreciated from a consideration of the following detailed description of preferred and alternate forms of the present invention when taken together with the accompanying drawings, in which:

FIGURE 1 is a sectional view through a drilled hole in a masory wall illustrating the installation of a preferred form of wedge type expansion bolt, in accordance with the present invention.

FIGURE 2 is a fragmentary view, partially in section, of the expansion bolt shown in FIGURE 1 and illustrating the relative disposition between the wedging members and bolt shank prior to their movement into wedging engagement with the wall of the hole.

FIGURE 3 is an end view of the wedge members for the expansion bolt shown in FIGURES 1 and 2.

FIGURE 4 is an end view of the leading end of the shank portion for the form of invention shown in FIGURES 1 and 2.

FIGURE 5 is a fragmentary, side elevation of a modified form of the present invention.

FIGURE 6 is a sectional view taken about line 6—6 of FIGURE 5.

FIGURE 7 is a fragmentary, side elevation of another modified form of the present invention.

FIGURE 8 is a sectional view taken about line 8—8 of FIGURE 7.

FIGURE 9 is a fragmentary, side evelation of still another modified form of the present invention; and FIGURE 10 is a sectional view taken on line 10—10 of FIGURE 9.

Referring in detail to the drawings, there is illustrated in FIGURES 1 to 4 a preferred form of invention comprised of an expansion bolt member 10 having an elongated cylindrical shank 12 with a threaded end portion 14 at the exterior end of the shank. The shank is of uniform diameter throughout except for a leading end section 15 which is upset or otherwise flared to provide diametrically opposed, inclined surfaces 16 diverging outwardly and forwardly from the peripheral surface of the shank and terminating in opposed, rounded extremities 18 separated by an intermediate relatively narrow portion 19. In this form, a pair of semicircular, sleeve-like wedge members 20 and 21 are interconnected by a generally U-shaped bail 22 including a bight 23 and opposite connecting arm portions 24 which are attached to the leading extremities of the members 20 and 21. Each of the wedging members 20 and 21 is tapered forwardly from trailing end 25 to leading end 26 so as to define inner bearing surfaces 27 which when positioned in surrounding relation to the leading end 15, in the manner shown in FIGURE 2, are complementary to the peripheral surface of the shank just rearwardly of the leading end section 15 and to the forward inclined surface 16 along the leading end section 15.

In accordance with conventional practice, a washer 30 and securing nut 32 are carried on the threaded end 14 of the shank for tightening the bolt in place within a drilled hole or bore B in a manner to be described. However, an important feature of the present invention resides in the disposition of a coiled spring member 34 on the peripheral surface of the shank just rearwardly of the wedging members between a rearward, fixed washer 35 mounted on the shank and a forward movable washer 36 which bears against the trailing ends 25 of the wedging members. Normally, upon insertion into the drilled hole B the wedging members 20 and 21 will engage the surrounding wall of the hole and be urged rearwardly to cause compression of the spring 34 as shown in FIGURE 2. However, upon tightening of the securing nut 32 to cause outward withdrawal of the shank, the spring member 34 will be free to expand and to urge the wedge members forwardly and outwardly along the inclined surfaces 16 into firm anchored relation against the surrounding wall surface, as shown in FIGURE 1. It is important to note that the trailing ends 25 of the wedge members are free to expand outwardly whereas the leading ends 26 are somewhat restricted by the bail 22, and accordingly, upon outward displacement of the shank the trailing ends 25 will be urged outwardly ahead of the leading ends 26 into gripping engagement with the surrounding wall surface of the hole. It is further advantageous that the wedging elements be provided with roughened external surfaces, and in the form of invention illustrated in FIGURES 1 to 4 the wedging sleeve elements are provided with external threading 38 to frictionally engage the surrounding wall both upon insertion and withdrawal of the shank in relation to the hole.

In use, the wedging members together with the bail may be positioned over the leading end of the shank just prior to insertion in the hole, and upon insertion are forced rearwardly against the spring, since the forward urging of the spring is resisted by engagement between the external surface of the wedging elements and the wall of the hole. Once the shank portion is inserted to the desired depth continued urging of the spring 34 against the wedge members will maintain contact between the trailing end portions of the wedge members and the wall of the hole. Thereafter, the securing nut 30 is tightened against the entrance to the hole to cause movement of the shank portion in the direction of withdrawal; and due to the frictional engagement between the wedging members and wall surface of the hole under the urging of the spring the wedge members will continue to be forced outwardly into firm wedging engagement with the wall of the hole. Notwithstanding the size or diameter of the hole within reasonable limits the spring 34 will establish and maintain initial contact between the wedging members and the surrounding wall surface so that when tightened the wedging members will be forced into positive engagement with the surrounding wall under a minimum of displacement or tightening of the bolt. It will be further seen that by employing arcuate or sleeve-like wedge members the trailing ends 25 will establish substantially 360° wedging engagement with the surrounding wall surface so as to more uniformly anchor the bolt assembly in place.

In the form of invention shown in FIGURES 5 and 6, a cylindrical shank 40 is illustrated as being of uniform diameter with a leading end section 41 having an annular recess 42 formed in the body of the shank to define a circumferential shoulder 43 facing toward the leading end and an inclined circumferential bearing surface 44 diverging forwardly from the shoulder 43 and terminating at the forward extremity of the shank. Semicircular or arcuate wedging members 46 are correspondingly formed to have relatively thick trailing edge surfaces 48 squared to the longitudinal axis of the shank and the members tapering forwardly in thickness to provide an inner inclined bearing surface 49 complementary to that of the inclined bearing surface 44 in the recess. It will be noted that each wedging member is dimensioned such that its outer peripheral surface 50 is normally flush with the peripheral surface of the shank with the trailing end surface 48 abutting against the shoulder 43 and the inner inclined bearing surface 49 engaging the bearing surface 44 in the recess; and further the wedging members are coextensive with the recess so as to terminate in forward ends 52 of reduced thickness at the leading extremity of the shank. Preferably, the wedging elements are sized to be somewhat less than semicircular, as best seen from FIGURE 6, and terminate on opposite sides in longitudinal edges 54, each longitudinal edge being disposed in spaced facing relation to a longitudinal edge 54 of the opposite wedge member. In order to secure the wedging members in assembled relation within the recess and to bias the elements normally in a direction forcing them laterally and outwardly from the recess, spring elements 56 are positioned in the space between the facing edges 54 of the wedging elements and adjacent to the trailing end surfaces 48. Here, each spring element may be composed of spring steel having an elongated intermediate portion 58 with lateral wings 59 on opposite sides of the intermediate portion for insertion in aligned slots 60 in the longitudinal edges 54 of the wedging members. The spring elements are preferably crimped as designated at 62 so that the wing portions 59 must be forced into position within the slots 60 as well as to permit the springs to be compressed between the edges 54 when the bolt is inserted into a bore.

In use, a hole is drilled into the material for insertion of the expansion bolt, and the hole preferably being of a diameter corresponding to that of the shank portion 49. When the leading end of the shank is inserted through the bore, the outer peripheral surfaces of the wedging members are held inwardly by the surrounding wall of the bore against the urging of the springs 56 so as to lie within the recess with the trailing ends 48 abutting against the shoulder 43. Upon insertion to the desired depth, outward urging of the springs 56 at the trailing ends of the wedge members will assure initial contact with the wall of the bore prior to tightening or outward displacement of the shank portion, for example, in the manner indicated in FIGURE 1. As the bolt is tightened, continued urging of the spring elements at the trailing ends of the wedging elements in cooperation with the inclined bearing surface 44 of the recess will force the wedging members into positive wedging engagement with the surrounding wall of the bore. Again it is to be noted that spring tension is imparted through the wedging members adjacent to their trailing ends so as to encourage the outer trailing edges initially to bite into the surrounding wall as the wedges are urged forwardly and outwardly along the inclined bearing surfaces of the recess.

It will be evident that in place of a pair of semicircular wedging members a plurality of arcuate wedging members may be employed for disposition in surrounding relation within the recess, and upon outward expansion will establish uniform wedging action with the wall of the bore. Similarly, only a single spring element 56 need be utilized between two facing longitudinal edges to impart the desired flexing action to the wedging elements while securing the wedging elements in assembled relation to the shank prior to insertion into the bore, although it will be evident that more effective control of the wedges is accomplished by use of spring elements between each of the facing edges.

The modified form of invention illustrated in FIGURES 7 and 8 is similar to the form shown in FIGURES 5 and 6, and accordingly, like parts are correspondingly enumerated. However, in place of an elongated metal spring element 56, an expansible insert 70 composed of an elastomeric material is inserted between facing longitudinal edges 54. Preferably the inserts 70 are secured in place by a suitable adhesive between the contacting surfaces of each insert and the longitudinal edges. The inserts 70 are of a thickness such that the wedging members normally are spaced outwardly from the inclined bearing surface 44 of the recess; however upon insertion into a hole the wedging elements are forced inwardly to compress the inserts 70 between the edges. Again, upon tightening of the bolt and under the urging of the inserts 70, the trailing ends of the wedge members are held in contact with the wall of the hole and are forced outwardly and forwardly along the inclined bearing surface 44 into anchored relation against the wall of the hole.

In the form of invention shown in FIGURES 9 and 10 a shank portion 74 is illustrated as being provided with a leading end section 75 having an annular recess 76 formed in the body of the shank to define a shoulder 77 and inclined bearing surface 78 diverging forwardly toward the leading extremity of the shank. Diametrically opposed, longitudinally extending guide slots 80 are formed in the bearing surface 78 adjacent to the shoulder 72 with a transverse throughbore 82 extending between the slots 80 for reception of an expansible insert in the form of a coiled spring 84. A pair of semicircular wedging elements 86 are again provided for disposition within the recess and the wedging elements are generally of the same configuration as the wedging elements illustrated in FIGURES 5 to 8 so as to have a relatively thick trailing end surface 87 tapering forwardly to define an inclined bearing surface 88 coextensive with and complementary to the bearing surface 78 of the recess. In addition, each wedging element has an inwardly protruding guide member 90 on the bearing surface adjacent to its trailing end for insertion and forward sliding movement through one of the slots 80 and with opposite terminal ends of the coiled spring 84 bearing against the guide members 90. Here, as in the other forms of invention, the coiled spring is biased normally to urge the wedge members outwardly from the recess. When the bolt is inserted into a hole of a diameter corresponding to that of the bolt the wedging members will be held inwardly within the recess against the outward urging of the spring. Upon tightening, however, the action of the spring will be to force the trailing ends of the wedge elements outwardly away from the recesses as the wedge elements are caused to ride forwardly along the inclined bearing surface of the recess and with the guide members 90 sliding forwardly through the slots 80.

To temporarily secure the wedge members in assembled relation on the bolt any suitable form of retaining ring or band may be utilized; or, as shown, the terminal ends of the spring 84 may be temporarily secured to the inner surfaces of the guide members 90, such as, by spot welding or suitable adhesive but which connection will be broken as the wedge elements are forced to slide forwardly and outwardly along the inclined bearing surface into wedging engagement with the bore.

From the foregoing, it will be apparent that greatly improved anchoring action is realized through the use of arcuate wedge members which under the urging of expansible members acting against the increased area of the trailing ends will be held in firm engagement with the wall of the bore for subsequent displacement into anchored relation. The resilient expansion members may serve also to hold the wedge members temporarily in assembled relation prior to movement into wedging engagement but this is secondary to their primary function in selectively forcing the rearward, trailing ends of the wedging members outwardly into positive engagement with the wall of the bore. A particular advantage to be noted in this relation is that by selectively forcing the trailing ends into contact with the wall of the bore the leading ends of the wedges will be permitted to remain against the shank surface so as not to interfere with insertion of the bolt; and, in addition, the urging of the expansion members in the modified forms of invention is more nearly in a laterally outward direction as opposed to forward movement along the shank, whereby to exert positive pressure between the wedges and the surrounding wall of the bore. Furthermore, the simplicity of the arrangement is such that the wedging elements may normally be disposed to lie in flush relation, or substantially so, within the peripheral outline of the shank so that the bolt size may correspond with hole size and assure a good snug fit between the bolt and wall of the hole once anchored therein. Still further, the use of arcuate wedging elements will assure substantially 360° wedging action in order that the wedges will uniformly engage the wall of the hole and not be subject to shifting or accidental displacement from anchored engagement.

It is therefore to be understood that from the foregoing description of preferred and alternate forms of the present invention that various modifications and changes may be made in the specific design, construction and arrangement of parts without departing from the spirit and scope thereof as defined by the appended claims and reasonable equivalents thereof.

I claim:

1. In an expansion bolt, a shank portion of uniform diameter being adapted for insertion into anchored relation within a bore of corresponding diameter, said shank portion being provided with an annular recess formed in the body of said shank portion adjacent to the leading end thereof and including an inclined bearing surface diverging forwardly toward the leading end of said shank portion, at least two correspondingly formed, sleeve-like wedge members being dimensioned for insertion in the recess to lie within the peripheral outline of said shank portion, said wedge members terminating on opposite sides of longitudinal edges with each longitudinal edge of a wedge member being disposed in adjacent facing relation to a longitudinal edge of each next adjacent wedge member, and resilient expansion means between at least two facing longitudinal edges adjacent to the trailing ends being biased to yieldingly urge the trailing ends of said wedge members outwardly beyond the peripheral outline of said shank into contact with the wall of the bore whereupon movement of said shank portion in the direction of withdrawal from the bore said wedge members are displaced into anchored relation with the wall of the bore.

2. In an expansion bolt according to claim 1, there being a pair of substantially semicircular sleeve-like wedge members arranged in diametrically opposed, surrounding relation to said shank portion within the recess, and said resilient expansion means being secured to the longitudinal edges adjacent to the trailing ends of said wedge members for radially outward urging of the trailing ends into contact with the wall of the bore.

3. In an expansion bolt according to claim 2, said resilient expansion means being defined by a spring member inserted in aligned slots in the longitudinal edges adjacent to the trailing ends of said wedge members.

4. In an expansion bolt according to claim 2, said resilient expansion means being defined by an elongated strip of elastomeric material secured between the facing longitudinal edges adjacent to the trailing ends of said wedge members.

5. In an expansion bolt, a cylindrical shank portion of uniform diameter being adapted for insertion into anchored relation within a bore of corresponding diameter, said shank portion including an annular recess formed in the body of said shank portion adjacent to the leading end thereof to provide a relatively deep, circumferential shoulder squared to the longitudinal axis of said shank with an inclined bearing surface diverging forwardly from the shoulder toward the leading end of said shank portion, a pair of correspondingly formed, sleeve-like wedging elements being dimensioned for insertion in the recess to lie within the peripheral outline of said shank, said wedge members having relatively thick trailing ends and inner bearing surfaces complementary to the bearing surfaces in the recess, guide members projecting inwardly from adjacent the trailing ends of each of said wedge members for disposition in longitudinal guide slots formed on diametrically opposed sides of the recess, and resilient expansion means inserted within a transverse bore extending through the body of said shank between said guide slots, said resilient expansion means contacting said guide members to yieldingly urge the trailing ends of said wedge members outwardly into contacting relation with the wall of the bore for continued movement of said wedging members into wedging engagement with the wall of the bore upon movement of said shank portion in the direction of withdrawal from the bore.

6. In an expansion bolt, a shank portion being adapted for insertion in a bore, said shank portion having an annular recess adjacent to its leading end provided with a forwardly divergent, inclined external bearing surface, at least two sleeve-like wedge members being disposed in surrounding relation to the recess and being dimensioned to lie within the recess within the peripheral outline of said shank portion, each of said wedge members including resilient expansion means extending inwardly toward the shank from adjacent the trailing end portions of said wedge members and being biased in a direction to yieldingly urge the trailing ends of said wedge members radially and outwardly into contact with the wall of the bore, said wedge members being slidable, upon movement of said shank portion in the direction of withdrawal from the bore along said external bearing surface into anchored relation in the bore.

References Cited

UNITED STATES PATENTS

| 2,774,273 | 12/1956 | Olson | 85—79 |
| 2,787,931 | 4/1957 | McCabe | 85—77 |

FOREIGN PATENTS

| 1,305,740 | 8/1962 | France. |
| 82,755 | 3/1964 | France. |
| 1,008,836 | 11/1965 | Great Britain. |

EDWARD C. ALLEN, *Primary Examiner.*